United States Patent [19]

Wooten et al.

[11] Patent Number: 4,772,124
[45] Date of Patent: Sep. 20, 1988

[54] PROBE FOR A RADIOMETER

[75] Inventors: Robert D. Wooten, Rockville; Delroy O. Walker, Mt. Rainier; James D. Hill, Mt. Airy, all of Md.

[73] Assignee: Fusion Systems Corporation, Rockville, Md.

[21] Appl. No.: 42,088

[22] Filed: Apr. 24, 1987

[51] Int. Cl.⁴ ............................................. G01J 1/42
[52] U.S. Cl. ...................................... 356/218; 356/225
[58] Field of Search .............. 356/225, 218, 213, 221, 356/236, 446

[56] References Cited

U.S. PATENT DOCUMENTS

| 4,040,747 | 8/1977 | Webster et al. | 356/446 X |
| 4,047,032 | 9/1977 | Judge | 356/446 X |
| 4,703,173 | 10/1987 | Wood et al. | 356/236 |

FOREIGN PATENT DOCUMENTS

| 0081287 | 7/1978 | Japan | 356/213 |
| 0153220 | 11/1981 | Japan | 356/213 |
| 0763694 | 9/1980 | U.S.S.R. | 356/213 |
| 0819646 | 4/1981 | U.S.S.R. | 356/446 |

Primary Examiner—R. A. Rosenberger
Assistant Examiner—Steven J. McGowan
Attorney, Agent, or Firm—Pollock, Vande Sande & Priddy

[57] ABSTRACT

An instrument for measuring radiation including a probe for collecting light. The probe includes a diffusive reflective surface at the forward end of the probe and an aperture block containing a pair of apertures to direct light reflected from the reflector to an optical waveguide and then to a light sensor and display unit.

10 Claims, 2 Drawing Sheets

PROBE FOR A RADIOMETER

This invention relates to devices for measuring the intensity of light, and more particularly, to a probe for collecting light in a zone characterized by intense radiation and limited access for placing or installing instrumentation.

BACKGROUND OF THE INVENTION

The efficiency of processes which use light to make physical or chemical changes in material can be affected by the amount and/or spatial distribution of light, which in turn can be affected by the size, configuration and positioning of the light source, reflectors and object to be treated. For some processes, it is difficult to measure the amount of light which impinges on a surface because of limited access for placing or installing instrumentation. Typical of these processes are those in which a reflector or light source is extremely close to the object being irradiated. In some processes, light is impinging on a surface from more than one direction and in order to ensure accuracy, light measurements must be made immediately adjacent to that surface. In other processes, problems arise due to the intensity of the radiation which prevents or limits the use of conventional compact radiometers.

SUMMARY OF THE INVENTION

It is accordingly one object of this invention to provide apparatus for measuring the intensity of light in a zone immediately adjacent the surface of a solid.

It is another object of this invention to provide a probe for collecting radiation which is passing through a zone which has restricted access for placing and/or installing instruments.

It is still another object of this invention to provide a probe for collecting radiation within a zone containing high levels of radiant energy.

It is yet another object of this invention to provide a probe for collecting representative amounts of non-unidirectional radiation which impinges on a plane surface.

In accordance with this invention, there is provided a probe which has a diffusive reflective coating of a substrate as a light collecting surface mounted on the forward end of the probe. The area of the surface which collects and transmits light to be measured is defined by a pair of spaced apart apertures formed within an aperture block. The light which passes through the apertures originates in the fixed area and is transmitted to a light sensor by way of a light wave guide.

The probe described herein is capable of collecting and transmitting to a light sensor a representative sample of light which impinges on a plane surface even when the light is directed toward that surface from many different directions. This result is achieved because the diffusive reflective surface is sufficiently near the plane of the surface to be irradiated that there is substantially no difference, or little difference, between the intensity of light falling on the coating of diffusive reflective material and that falling on the surface to be treated.

DETAILED DESCRIPTION OF THE INVENTION

The probe of this invention may be used to collect and transmit light having a wide range of wavelengths including light having wavelengths in the infrared, visible and ultraviolet ranges. This probe is particularly useful in collecting representative amounts of high intensity radiation such as ultraviolet, and the invention is described herein with respect to ultraviolet. Radiation in other wavelengths can readily be monitored by selection of suitable materials for the diffusive reflective layer and the filters.

Figure 1:
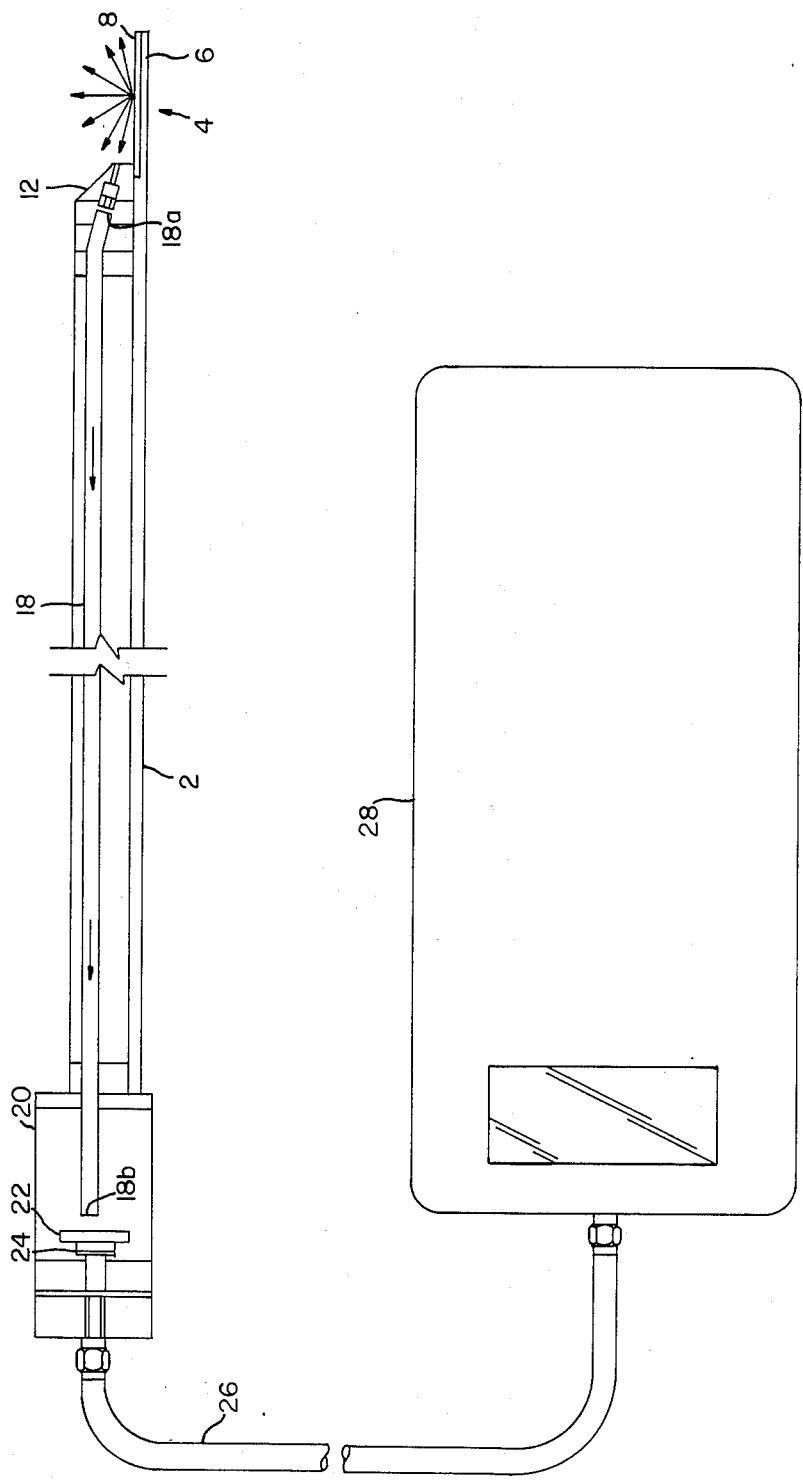
FIG. 1 is a sectional view of one embodiment of the probe of this invention, including auxiliary elements for filtering the collected light, sensing the intensity of light and displaying the signal generated by the light.

Referring to FIG. 1, probe housing 2 is provided at its forward end with diffuser 4 which consists of a thin substrate 6 coated with a diffusive reflective layer 8. Aperture block 12, which is mounted adjacent the diffuser 4 is provided with a pair of apertures 14, 16 which are oriented to define a fixed size elliptical target on the diffusive reflective layer 8.

Optical waveguide 18 is mounted within the probe housing 2 with a forward end 18a placed to collect light which passes through apertures 14, 16 and end 18b placed to emit light into sensor 24 through light filter 22. The electrical signal from sensor 24 is transmitted to display unit 28 through cable 26.

Since a reflector is the light-collecting element, diffuser 4 need only be thick enough to provide structural support for the reflective layer which typically will have a thickness of 0.001 inch or less. The substrate 6 can have a thickness as low as 1-3 mm, which results in an instrument having a reflective surface within about 1-3 mm of the surface being illuminated.

The diffusive reflective layer may be any of a variety of materials which are well known in the optical industry for their diffusive, reflectivity characteristics. Magnesium carbonate, magnesium oxide, barium sulfate and various fluorocarbon plastics such as, for example, polytetrafluoroethylene, are particularly suitable for use in high intensity ultraviolet environments because of their diffusive reflective and excellent high temperature properties.

The substrate and the housing can be of any material capable of withstanding the environment to which the probe is to be exposed. The substrate preferably is capable of forming a strong bond with the diffusion reflective material, and brass has been found to be excellent for use as the substrate and the housing.

Figure 2:
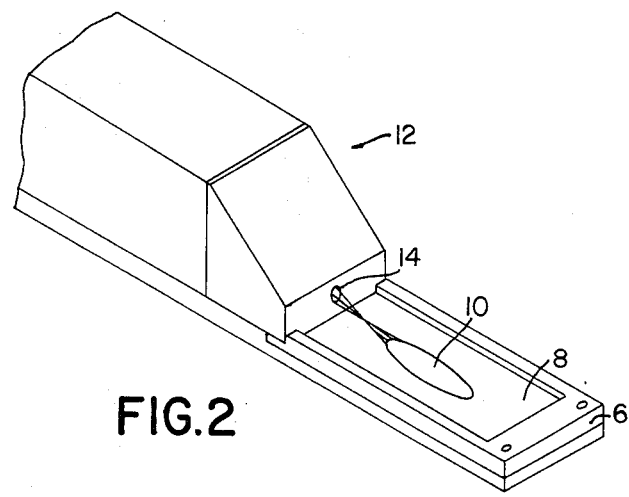
FIG. 2 is an isometric view of the diffuser and the aperture block.
Figure 3:
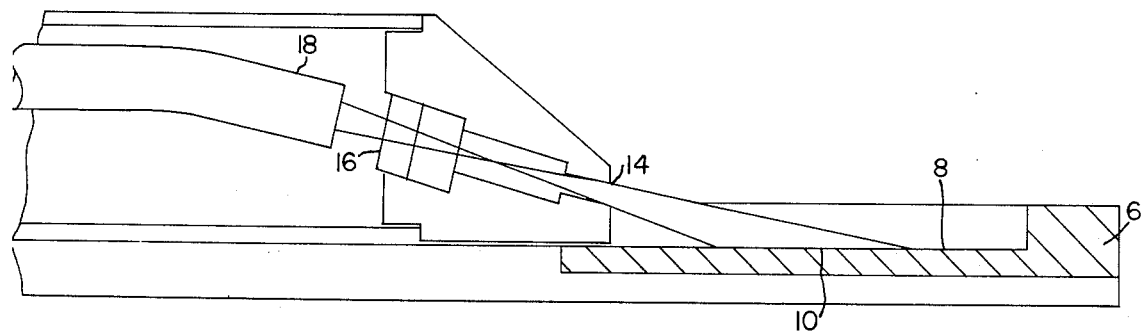
FIG. 3 is an enlarged sectional view showing the relationship between the pair of apertures in the aperture block and the fixed target area on the diffusive reflective area.

As shown in FIGS. 2 and 3, apertures 14, 16 in aperture block 12 define a fixed size elliptical target area 10 on diffusion reflective surface 8. The size and shape of the target area, all of which must be within the area of the coating of diffusive reflective material, are determined by (1) the sizes of the apertures, (2) the distance between the apertures, (3) the distance between forward apertures 14 and the target area, and (4) the angel which the line of sight of the apertures 14 and 16 make with the diffusive reflective surface.

The sizes of the apertures is not critical and the two apertures may have the same or different diameters. A diameter of each apertures of about 0.030 inch for apertures spaced 0.375 inch apart and having a 0.375 inch line of sight from the forward aperture to the center of the target area, and having an angle of sight at an angle of 15° will produce a target area which can be contained within an area having dimensions about ¼ inch by ¾ inch.

The line of sight which is established by apertures 14 and 16 must strike the diffusive reflective material at an acute angle, preferably at an angle of from about 10° to about 30°.

The aperture block should be sized and shaped so that it does not block light which would otherwise reach the target area. This requirement may in some instances control the angle of the line of sight and limit it to small angles such as from about 5° to about 15°.

In operation, ultraviolet radiation which strikes target area 10 is diffused and reflected, and a small fraction of this reflected radiation enters the aperture set 14, 16 and is transmitted into waveguide 18. The combination of diffusive reflective material and the aperture pair provides a true cosine response of radiation striking the surface and consequently ultraviolet radiation which strikes at diverse angles can be measured accurately.

During continuous use, the diffusive reflective material heats up, and materials such as magnesium oxide, magnesium carbonate and barium sulfate show an increase in reflectivity with an increase in their temperatures. Appropriate compensations may be made to accommodate changes in reflectivity, or the manner of use of the probe may be controlled to minimize the temperature effect as by measuring the light intermittently. For example, the apparatus may be used to operate in a measuring made for 10 seconds and then off for 15 seconds to permit the surface to cool before another 10 second measurement is made.

The auxiliary element for filtering light, sensing the intensity of light and displaying the signal generated by the light are elements which are well-known in the art, and specific embodiments suitable for use in the invention can readily be selected or constructed by workers in the art.

Modifications to and variations from the invention as specifically described herein can readily be made, and the scope of the invention is intended to be limited only by the appended claims.

What is claimed is:

1. A probe for a radiation-monitoring device comprising:
   (a) a probe housing having a forward end and a proximal end;
   (b) a diffusive reflector mounted at said forward end of said probe housing, said diffusive reflector comprising a thin substrate attached to the lower side of said probe housing and a coating of diffusive reflective material on the upper surface of said substrate;
   (c) an aperture block mounted on said probe housing near said forward end and adjacent to said diffusive reflector, said aperture block provided with a pair of spaced apart apertures oriented to define a fixed size target on the coating of diffusive reflective material; and,
   (d) a light waveguide mounted within said probe housing, said waveguide having a forward end oriented to collect light reflected from said target area via said apertures, and a proximal end for emitting collected light.

2. The probe according to claim 1, wherein the substrate for said diffusive reflector has a thickness of from about 1 mm to about 3 mm.

3. The probe according to claim 1 wherein the coating of diffusive reflective material is selected from high temperature inorganic materials.

4. The probe according to claim 1, wherein the coating of diffusive reflective material comprises fluorocarbon organic materials.

5. The probe according to claim 1, wherein the coating of diffusive reflective material comprises magnesium carbonate.

6. The probe according to claim 1, wherein the line of sight established by said pair of apertures strikes the coating of diffusive reflective material at an angle of from about 5° to about 30°.

7. The probe according to claim 1, wherein the line of sight established by said pair of apertures strikes the coating of diffusive reflective material at an angle of from about 10° to about 30°.

8. The probe according to claim 1, wherein said target area on said coating of diffusive reflective material comprises an elliptical area.

9. The probe according to claim 1 wherein the coating of diffusive reflective material comprises barium sulfate.

10. The probe according to claim 1 wherein the coating of diffusive reflective material comprises magnesium oxide.